US 11,241,820 B2

United States Patent
Pionetti et al.

(10) Patent No.: US 11,241,820 B2
(45) Date of Patent: Feb. 8, 2022

(54) MACHINE AND METHOD FOR SIMULTANEOUSLY LAYING CABLES IN A HELIX ON THE OUTER SURFACE OF A UNIT ELEMENT OF A FLUID TRANSPORT DUCT

(71) Applicant: SAIPEM S.A., Montigny le Bretonneux (FR)

(72) Inventors: François-Régis Pionetti, La Baleine (FR); Jalil Agoumi, Le Kremlin-Bicetre (FR); Axel Sundermann, Fontenay-les-Briis (FR)

(73) Assignee: Saipem S.A., Montigny le Bretonneux (FR)

( * ) Notice: Subject to any disclaimer, the term of this patent is extended or adjusted under 35 U.S.C. 154(b) by 496 days.

(21) Appl. No.: 16/461,312

(22) PCT Filed: Nov. 13, 2017

(86) PCT No.: PCT/FR2017/053099
§ 371 (c)(1),
(2) Date: May 15, 2019

(87) PCT Pub. No.: WO2018/091814
PCT Pub. Date: May 24, 2018

(65) Prior Publication Data
US 2020/0070400 A1  Mar. 5, 2020

(30) Foreign Application Priority Data
Nov. 16, 2016  (FR) ........................................ 1661077

(51) Int. Cl.
*B29C 53/70* (2006.01)
*B29C 53/68* (2006.01)
(Continued)

(52) U.S. Cl.
CPC .......... *B29C 53/68* (2013.01); *B29C 53/8008* (2013.01); *B29L 2023/22* (2013.01)

(58) Field of Classification Search
CPC .................................. B29C 53/70; B29C 53/68
See application file for complete search history.

(56) References Cited

U.S. PATENT DOCUMENTS

2003/0141011 A1* 7/2003 Daykin .................. B29C 63/10
156/187
2004/0099268 A1 5/2004 Smith et al.
(Continued)

FOREIGN PATENT DOCUMENTS

EP           0491353           6/1992

*Primary Examiner* — Jeffry H Aftergut
(74) *Attorney, Agent, or Firm* — Cozen O'Connor

(57) ABSTRACT

A machine (4) and a method therefore, for laying cables helically on the outside surface of a unit pipe element (2) for transporting fluids, the machine having a rotary frame (14) for centering about an axis of symmetry (X-X) of the unit pipe element, the frame supporting a plurality of winding elements designed to receive cables, each being situated in a respective plane that is longitudinal relative to the unit pipe element and the planes being spaced apart from one another around the axis of symmetry of the unit pipe element, means for adjusting the angle of inclination of each winding element relative to the longitudinal plane in which it is situated, a linear travel stepper motor for moving the frame along the unit pipe element, and a rotary travel stepper motor for causing the frame to turn about that axis of symmetry of the unit pipe element.

13 Claims, 14 Drawing Sheets

(51) Int. Cl.
  *B29C 53/80*   (2006.01)
  *B29L 23/00*   (2006.01)

(56) References Cited

U.S. PATENT DOCUMENTS

2005/0039843 A1    2/2005   Johnson
2015/0300539 A1   10/2015   Charboneau et al.

* cited by examiner

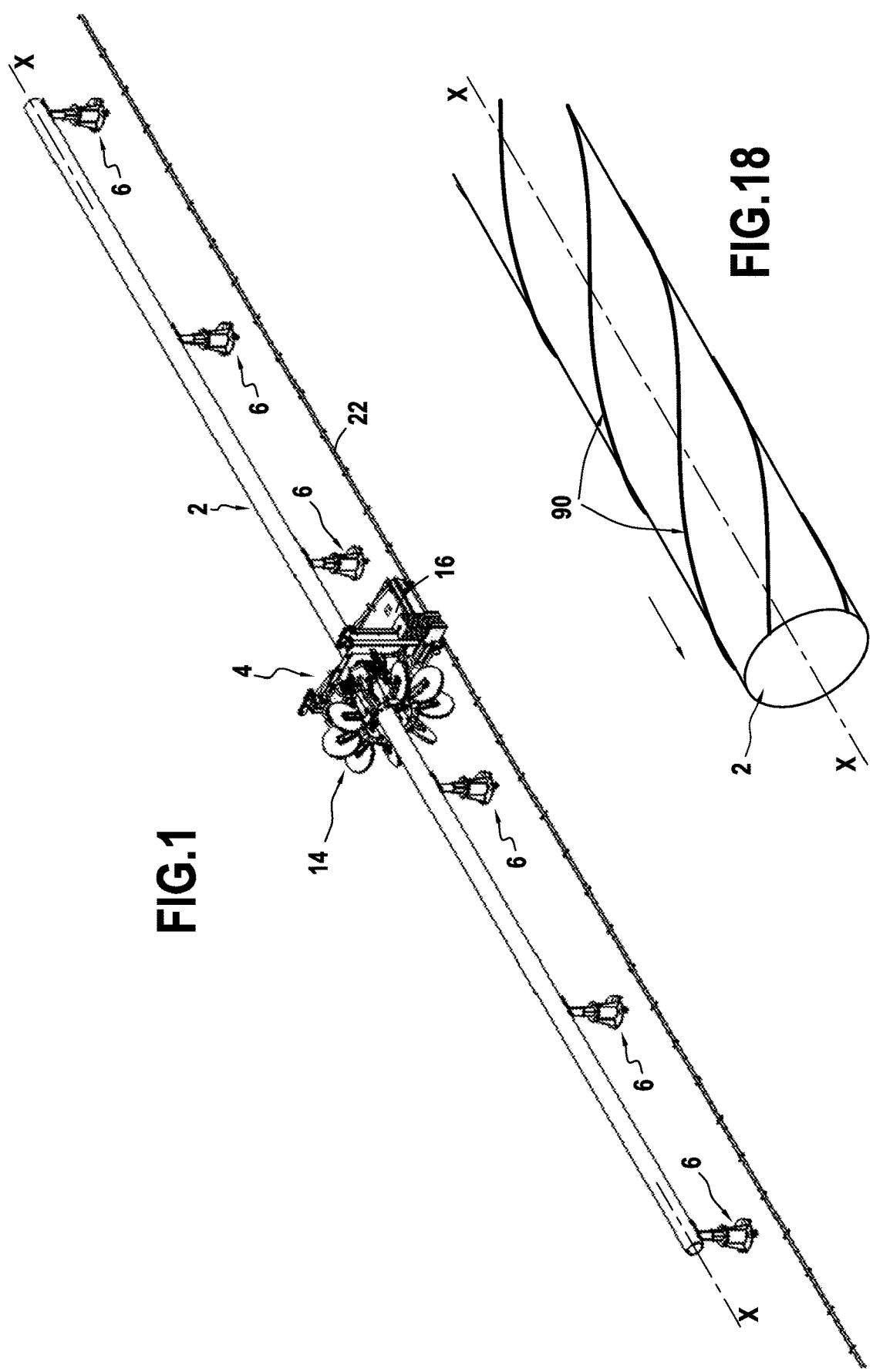

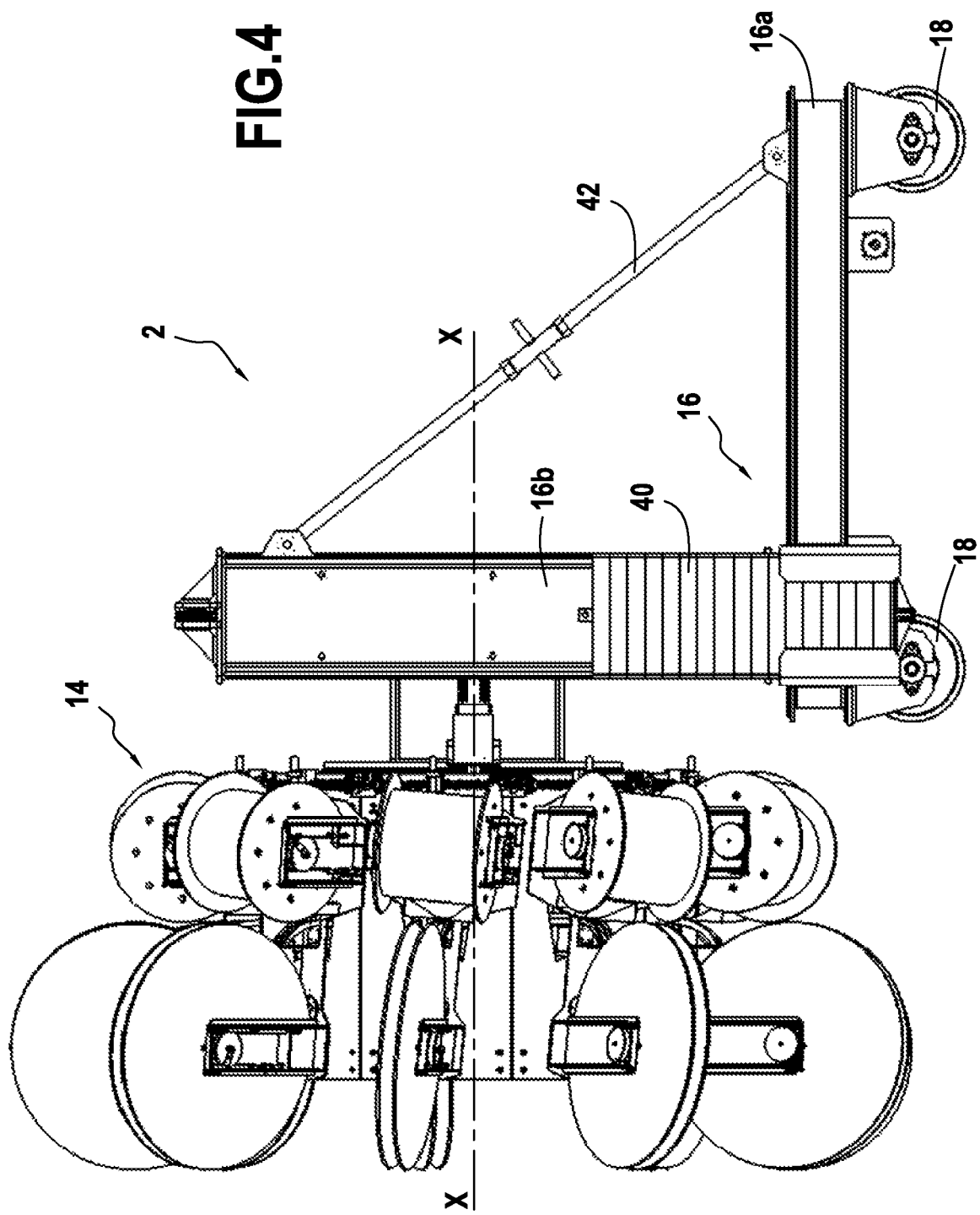

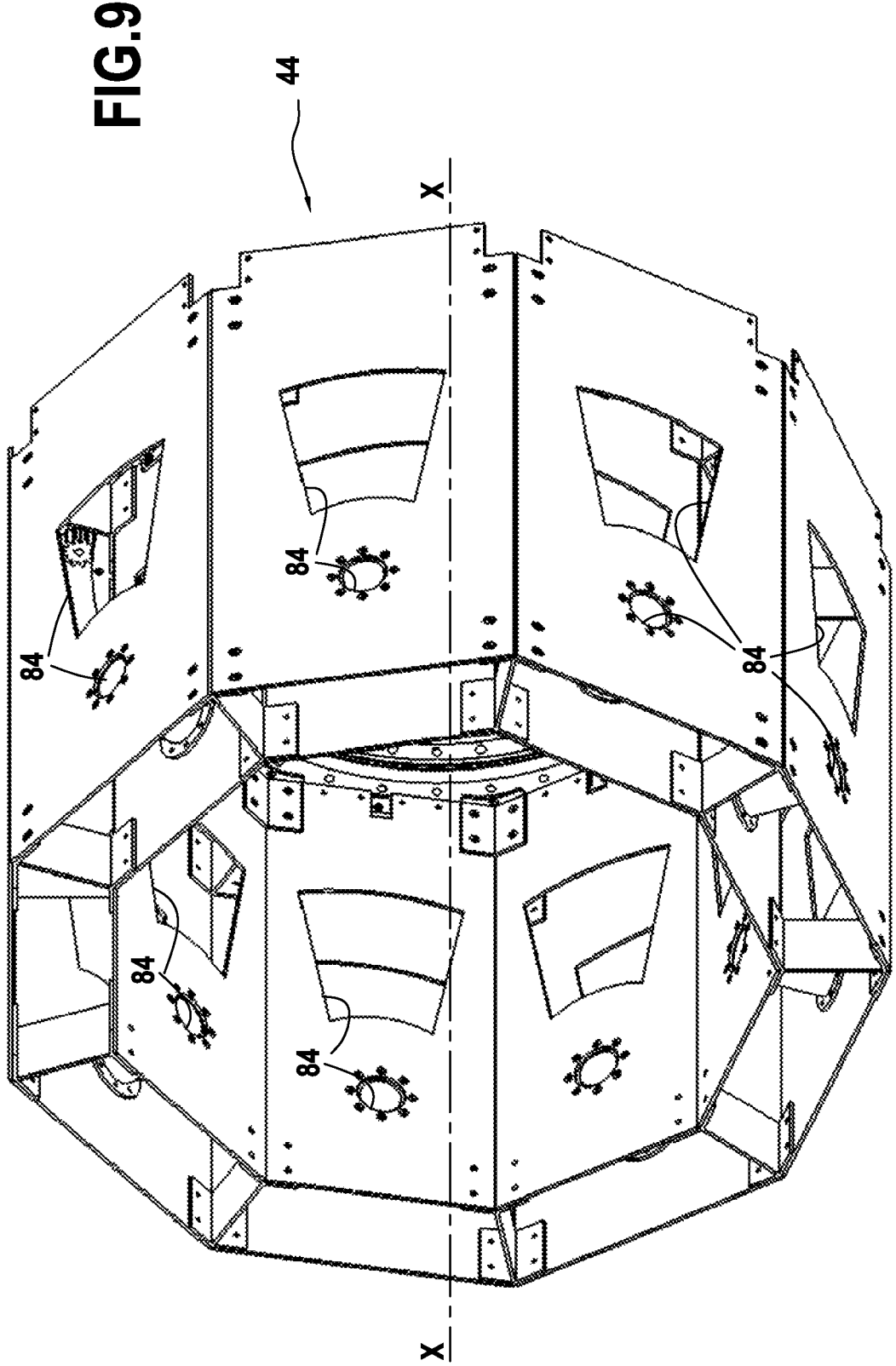

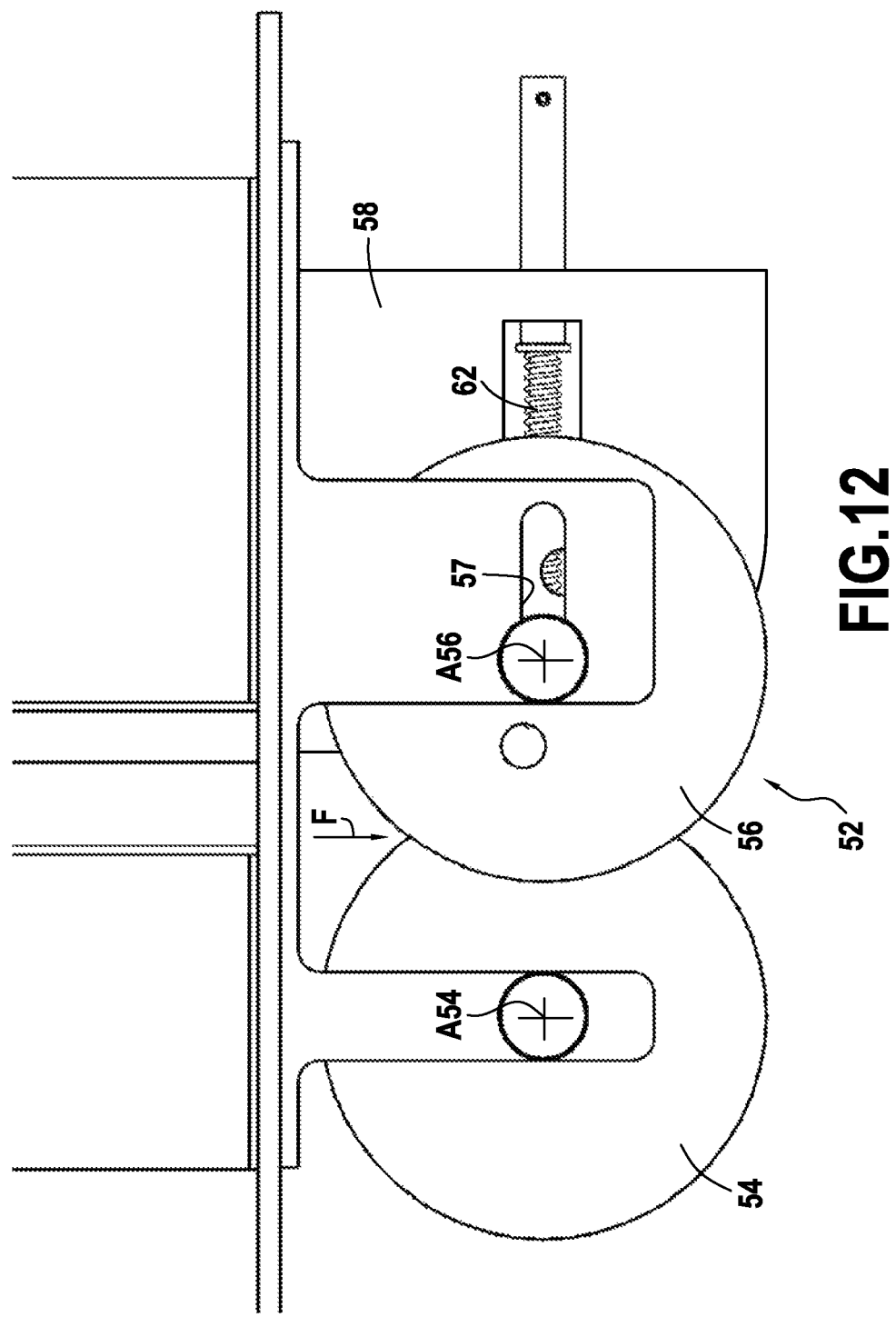

MACHINE AND METHOD FOR SIMULTANEOUSLY LAYING CABLES IN A HELIX ON THE OUTER SURFACE OF A UNIT ELEMENT OF A FLUID TRANSPORT DUCT

This is a U.S. national stage of application No. PCT/FR2017/053099, filed on Nov. 13, 2017. Priority is claimed on France Application No. FR1661077, filed Nov. 16, 2016, the content of which is incorporated herein by reference.

BACKGROUND OF THE INVENTION

The present invention relates to the general field of pipes for transporting fluids in order to transfer hydrocarbons, e.g. oil or gas, coming from undersea production wells.

The invention relates more precisely to a machine for laying a plurality of cables (e.g. electric heater cables) in a helix (also known as "spiral winding") simultaneously on the outside surface of such a pipe.

Various types of undersea pipe exist that are used for transporting hydrocarbon fluids, and that comprise a single tube or coaxial tubes. The invention relates more particularly to coaxial tube type pipes known as "pipe-in-pipe" (PIP), in which an inner steel tube transports the fluids and an outer steel tube arranged coaxially about the inner tube comes into contact with the surrounding medium, i.e. water.

Generally, coaxial pipes are assembled on land to form elements of unit length (also known as unit pipe elements or strings), that are about 10 meters (m) to 100 m long, depending on the loading capacity of the pipe-laying system. Such unit pipe elements are then transported at sea on a laying ship. During laying, they are connected to one another on board the ship progressively as laying takes place at sea.

Furthermore, it is known to heat coaxial pipes along their entire length by means of a plurality of electric cables that are wound around the outside surface of the inner tube in order to heat it by the Joule effect. This heating technique, known as "trace heating", serves to heat the hydrocarbon fluids transported in the undersea pipe at a temperature higher than a critical threshold over their entire path from the production well to the surface installation, thereby avoiding the formation of hydrate crystals or other solid deposits that would lead to plugs being created that are capable of blocking the undersea pipe.

Typically, the electric heater cables are flat cables that are provided with rubber protection and that are arranged helically on the outside surface of the inner tube of each unit pipe element. In practice, such laying is generally performed individually for each unit pipe element by unwinding the various electric cables from a stationary station, with the inner tube of the unit pipe element being moved longitudinally through the stationary station. For this purpose, the inner tube of the unit pipe element is positioned on a support that moves it longitudinally through the stationary station while also causing it to turn about its axis of symmetry so as to enable the cables to be laid on the outside surface of the inner tube with helical motion.

That type of helical cable laying by means of a stationary station through which the unit pipe element is moved in translation nevertheless presents a certain number of drawbacks. Specifically, as a result of the forward movement of the inner tube of the unit pipe element being both longitudinal movement and turning movement, the cables are necessarily laid on the outside surface of the inner tube with twisting motion. Unfortunately, such twisting stress imparted to the cables while they are being laid can give rise to loops being created in the cables once they have been laid. Furthermore, the accumulation of residual torque can lead to knots forming that damage the cables and that lift them off the outside surface of the inner tube of the pipe. Furthermore, that type of helical laying requires the inner pipe of the unit pipe element to be moved, which requires a mechanism to be provided that is relatively complex and thus expensive.

OBJECT AND SUMMARY OF THE INVENTION

The present invention thus has a main object of proposing a machine for laying cables helically without presenting the above-mentioned drawbacks.

In accordance with the invention, this object is achieved by a machine for laying cables simultaneously and helically on the outside surface of a unit pipe element for transporting fluids, the machine comprising:

a rotary frame for centering about an axis of symmetry of the unit pipe element, the frame supporting a plurality of winding elements designed to receive cables for laying on the unit pipe element, each winding element being situated in a respective plane that is substantially longitudinal relative to the unit pipe element and the planes being spaced apart from one another around the axis of symmetry of the unit pipe element;

means for adjusting the angle of inclination of each winding element relative to the longitudinal plane in which it is situated;

a linear travel stepper motor for moving the frame along the unit pipe element; and a rotary travel stepper motor for causing the frame to turn about that axis of symmetry of the unit pipe element.

The invention thus proposes laying a plurality of cables simultaneously and helically from a machine that travels along the unit pipe element, while the unit pipe element remains stationary during the laying process. The machine of the invention thus presents a design that is simplified compared with a machine that needs to move the unit pipe element linearly while also causing it to turn about its own axis. Furthermore, since each winding element is situated in a plane that is substantially longitudinal relative to the unit pipe element, it is possible to lay the cables helically on the outside surface of the unit pipe element without exerting twisting stress thereon, thereby avoiding the problems that are inherent to that type of stress.

Advantageously, Each Winding Element Comprises:

a storage reel having the cable for laying on the unit pipe element wound thereon:

an unwinding reel for receiving one end of the cable unwound from the storage reel in order to take it to the outside surface of the unit pipe element;

a guide system for guiding the cable unwound from the storage reel to the outside surface of the unit pipe element; and a compression system for applying a compression force on the cable that has just been laid on the outside surface of the unit pipe element.

The compression system of each winding element may comprise a telescopic rod having one end fastened to the unwinding reel and an opposite end connected to a wheel with a spring being interposed between them, said wheel being suitable for running on the outside surface of the unit guide element while the cable is being laid. As a result, the wheel serves to apply a compression force on the cable that has just been laid on the outside surface of the unit pipe element, thereby improving its fastening.

Likewise, the guide system for each winding element may comprise a roller device for automatically removing plastics strips covering adhesive strips of the cable prior to laying said cable on the outside surface of the unit pipe element, and a deflector for guiding the cable from the unwinding reel to the roller device. Advantageously, the adhesive strips serve to fasten the cable on the outside surface of the unit pipe element. Under such circumstances, the roller device may comprise a drive roller for receiving a free end of the cable coming from the unwinding reel together with winding rollers for having wound thereon the plastics strips separated from the cable.

Advantageously, each storage reel and unwinding reel is provided with a braking system. The presence of such a braking system serves firstly to apply tension while laying the cable, and secondly to slow the reels down quickly at the end of laying.

Each winding element may be mounted on a face of the frame via a plate that is suitable for turning about a radial direction that is radial relative to the axis of symmetry of the unit pipe element, the frame also comprising a wormscrew system coupled to each plate in order to adjust the angle of inclination of each winding element relative to the longitudinal plane in which it is situated. Under such circumstances, the wormscrew systems are preferably synchronized with one another in order to enable the same angle of inclination to be given to each winding element.

The machine may further comprise a carriage supporting the frame via a guide ring for centering on the axis of symmetry of the unit pipe element, the carriage being provided with wheels driven by the linear travel stepper motor and suitable for traveling along a guide rail.

Under such circumstances, the guide ring of the carriage may include a toothed wheel that meshes rotatably with the rotary travel stepper motor. Furthermore, the carriage may comprise means for adjusting the vertical position and the horizontal position of the frame, and guide rollers for guiding the unit pipe element.

Preferably, the machine further comprises optical means for determining the distance between the frame and the end of the unit pipe element towards which the frame is traveling. These optical means thus serve not only to monitor accurately the progress with which the cables are being laid, but also to servo-control the rotary motion of the frame relative to its linear travel.

The frame may be polygonal in shape having a plurality of faces on which the winding elements are mounted.

The invention also provides a method of laying cables helically on the outside surface of a fluid transport unit pipe element by means of a machine as defined above, the method comprising:

positioning the rotary frame of the machine around an axis of symmetry of the unit pipe element at one of its ends; and
  controlling the linear travel and rotary travel stepper motors of the machine so as to enable the machine to advance linearly towards the opposite end of the unit pipe element with rotation of its rotary frame being synchronized in order to ensure that all of the cables are laid simultaneously and helically on the outside surface of the unit laying element.

BRIEF DESCRIPTION OF THE DRAWINGS

Other characteristics and advantages of the present invention appear from the following description made with reference to the accompanying drawings, which show an embodiment having no limiting character. In the figures:

FIG. 1 is a perspective view showing a spiral winding machine in an embodiment of the invention while in operation;

FIG. 4 is a side view of the FIG. 1 spiral winding machine;

FIG. 9 shows a detail of the support structure for the rotary frame of FIGS. 7 and 8;

FIG. 12 shows a roller device of the system for guiding the winding element of FIG. 10;

FIG. 18 shows a portion of a unit pipe element having its outside surface carrying cables that have been laid helically by using the spiral winding machine of FIG. 1.

DETAILED DESCRIPTION OF THE INVENTION

The invention relates to a machine for laying cables simultaneously and helically on the outside surface of an undersea unit pipe element as shown in FIG. 1 (which machine is referred to below as a "spiral winding machine").

The cables that are laid may be electric cables that are wound around the outside surface of the inner tube of a coaxial undersea pipe in order to heat it by the Joule effect (for trace heating) or optical fiber cables wound around the outside surface of the inner tube of a coaxial undersea pipe in order to monitor the mechanical deformation that applies thereto.

Typically, such cables are flat cables that are provided with rubber protection and that are covered on one of their faces in two strips of adhesive enabling them to be held on the surface, the adhesive strips being protected by plastics strips.

FIG. 1 shows a unit pipe element 2 that, once assembled with other unit pipe elements, is to form a tube of an undersea pipe (e.g. the inner tube of a coaxial pipe), together with a spiral winding machine 4 in accordance with the invention.

The unit pipe element 2 is positioned horizontally above the ground, being supported by a plurality of supports 6

(there being six of them in the figure), which supports are regularly spaced apart from one another.

Figure 2:
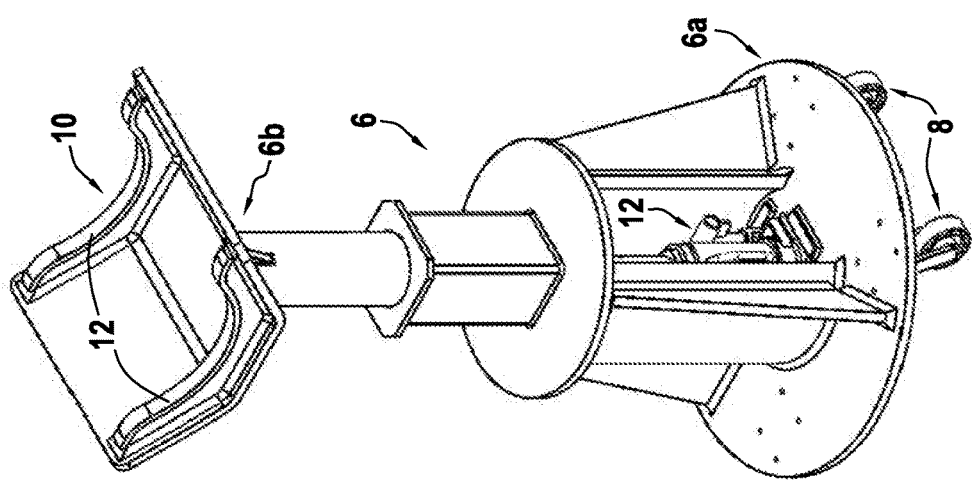
FIG. 2 shows an example of a unit pipe element support suitable for use in association with the spiral winding machine of FIG. 1.

As shown in greater detail in FIG. 2, the supports 6 are stands that are provided in a bottom portion 6a with castors 8 enabling them to be moved, and in a top portion 6b with a seat 10 of rounded shape on which the unit pipe element rests.

The height of the seat 10 of such a support 6 can be adjusted, e.g. by means of a pneumatic actuator 12. Furthermore, the seat 10 is preferably provided with strips of elastomer 12 for limiting the soiling of cables placed on the outside surface of the unit pipe element.

The spiral winding machine 4 of the invention performs two movements relative to the stationary unit pipe element that rests horizontally on the supports 6: it is capable of moving linearly along the unit pipe element 2, while also being suitable for turning about an axis of symmetry X-X thereof.

Furthermore, the spiral winding machine 4 of the invention is constituted mainly by a rotary frame 14 carrying spiral winding means proper (described below) and by a movable carriage 16 that supports the frame (FIG. 4).

Figure 3:
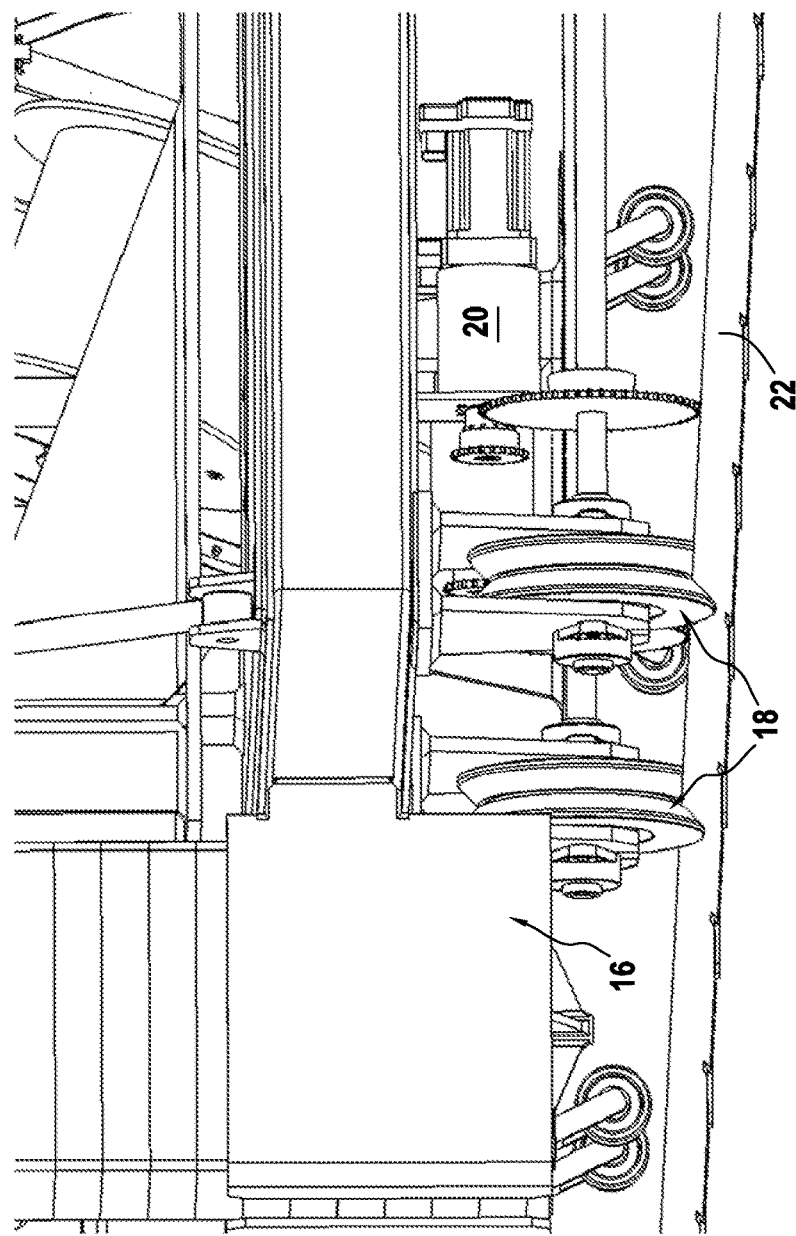
FIG. 3 shows in greater detail the linear travel of the FIG. 1 spiral winding machine.

As shown in FIG. 3, in order to move along the unit pipe element, the movable carriage 16 of the spiral winding machine is provided with wheels 18 that are driven by a linear travel stepper motor 20 and that are guided on a rail 22 laid on the ground parallel to the unit pipe element 2.

Figure 5:
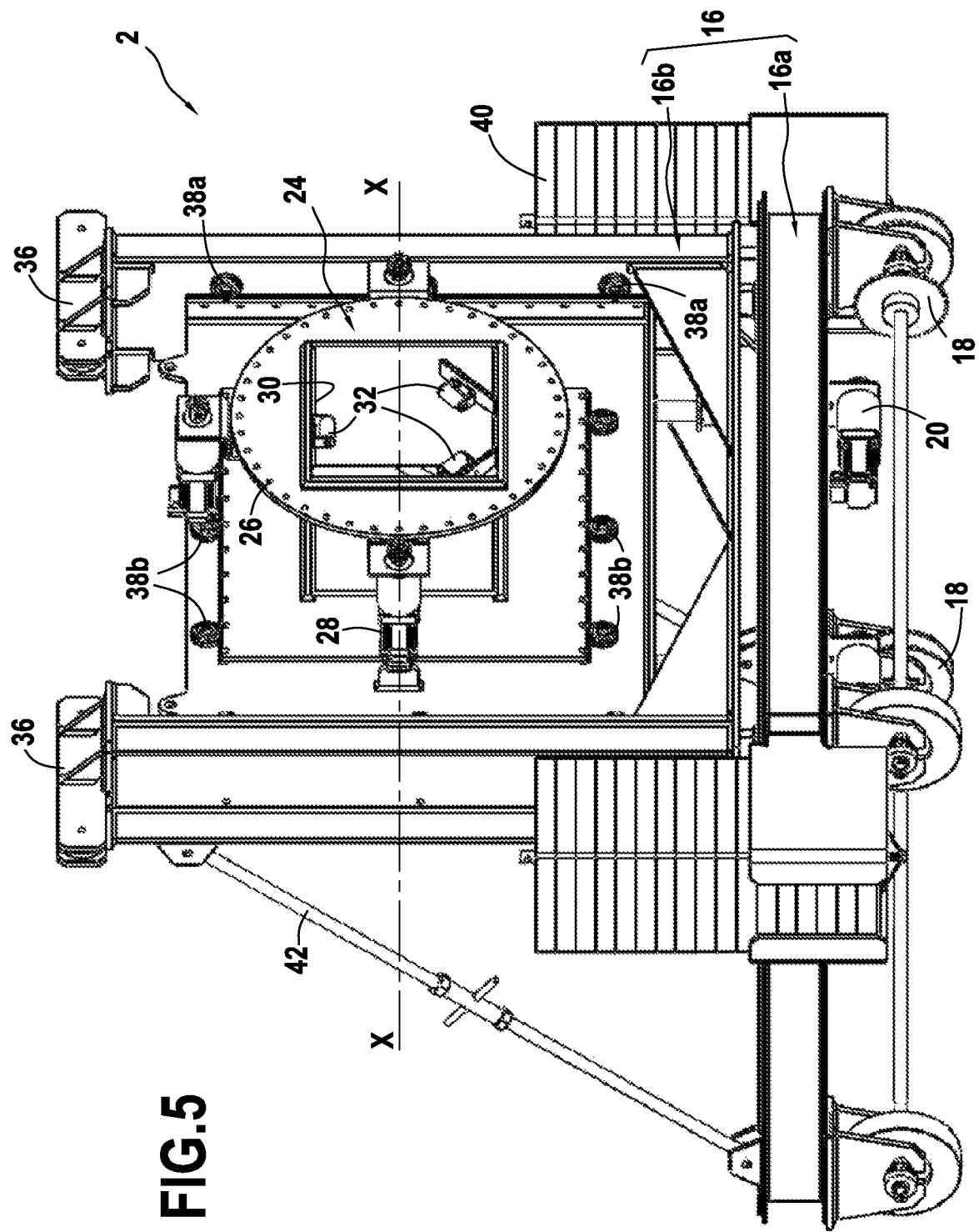
FIG. 5 is a three-quarter front view of the spiral winding machine without its rotary frame.
Figure 6:
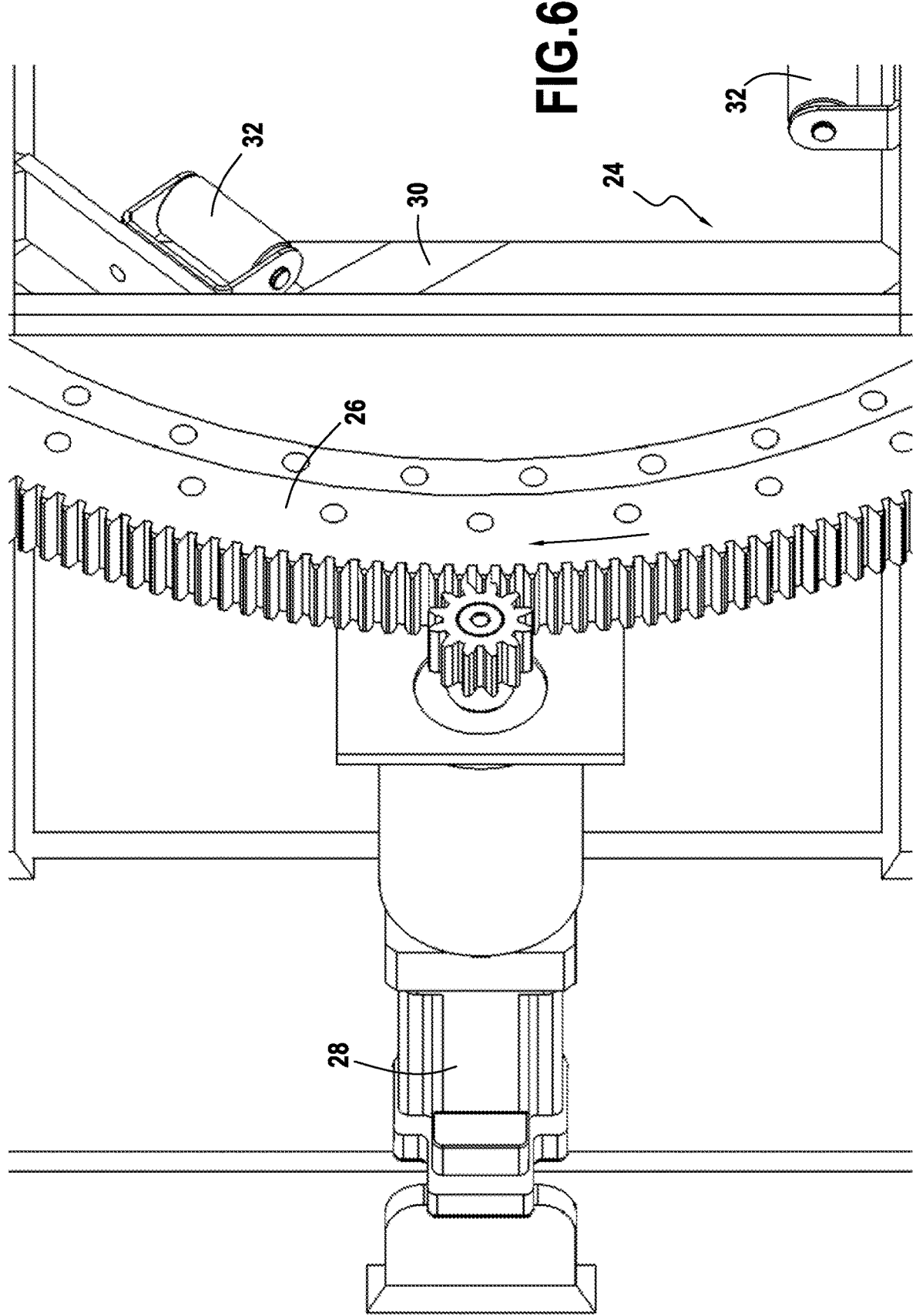
FIG. 6 is an enlargement of FIG. 5 showing the mechanism for turning the rotary frame relative to the carriage.
Figure 7:
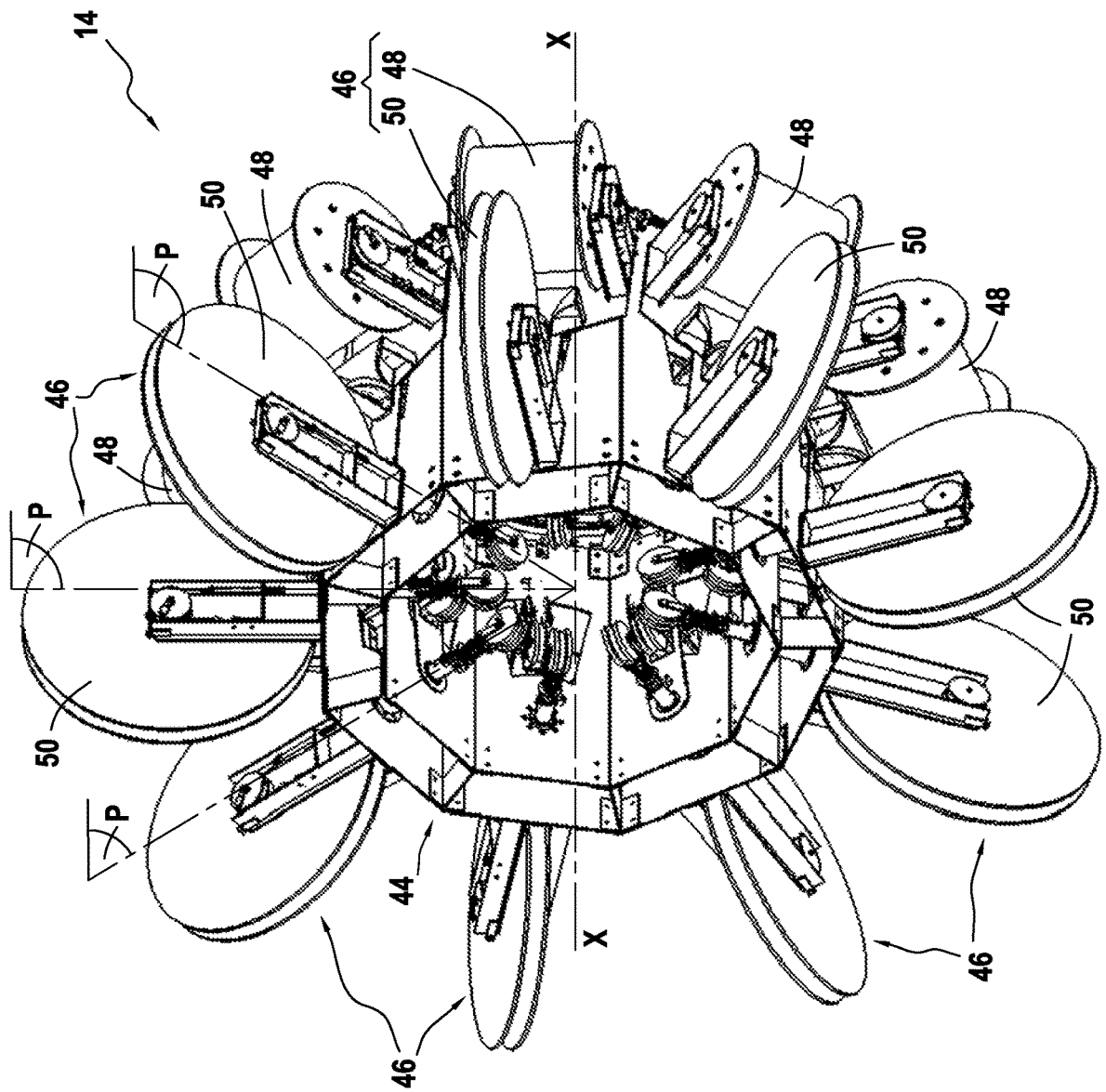
FIGS. 7 and 8 are perspective views of the rotary frame of the spiral winding machine, respectively in an upstream view and in a downstream view.
Figure 8:
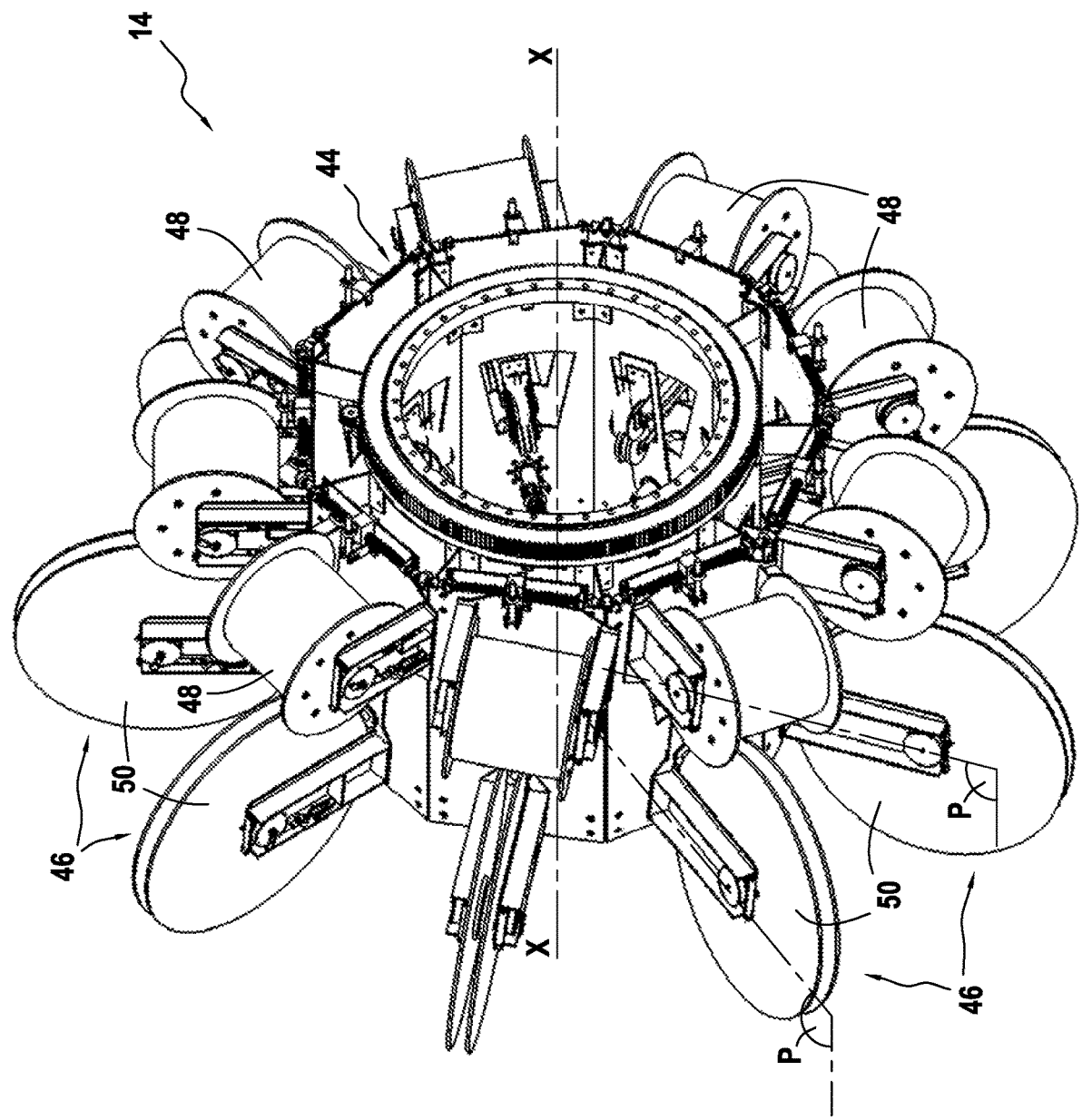

FIGS. 4 to 6 show in greater detail the structure of the movable carriage 16 of the spiral winding machine of the invention. The carriage presents a bottom platform 16a having the wheels 18 mounted thereto, together with a top platform 16b that is substantially vertical.

The movable carriage 16 supports the rotary frame 14 on its top platform by means of a guide ring 24 that is positioned so as to be centered on the axis of symmetry X-X of the unit pipe element.

At its periphery, the guide ring 24 of the movable carriage carries a toothed wheel 26 (see FIG. 6) that is likewise centered on the axis X-X and that meshes rotatably with a rotary travel stepper motor 28. By actuating the rotary travel stepper motor 28, the toothed wheel 26 is suitable for turning about the axis X-X, thereby driving the rotary frame 24 in rotation around the unit pipe element, which frame carries the spiral winding means proper.

The guide ring 24 of the movable carriage also has a window 30, e.g. of square shape, through which the unit pipe element is to pass during the linear travel of the spiral winding machine. Guide rollers 32 positioned inside this window 30 serve to ensure that the unit pipe element is properly centered during the linear travel of the spiral winding machine.

The movable carriage 16 also carries two lasers 36 on its top platform (FIG. 5). These lasers are calibrated to emit a light beam downstream (relative to the linear travel of the spiral winding machine) towards a reflecting panel (not shown in the figures) positioned at the end of the unit pipe element. These optical means thus serve not only to monitor the accuracy with which the laying of the cables is progressing, but also to servo-control the rotary movement of the spiral winding machine on its linear travel.

Furthermore, the movable carriage 16 also has, on its top platform 16b, means for adjusting the vertical position and the horizontal position of the rotary frame 14 of the spiral winding machine.

By way of example, these means are in the form of rollers 38a that are arranged vertically and rollers 38b that are arranged horizontally so as to enable the guide ring 24 that supports the rotary frame 14 of the spiral winding machine (FIG. 5) to be moved in both the vertical and the horizontal directions. A counterweight system 40 may serve to facilitate adjusting the vertical position of the frame.

Finally, a system of rods 42 connecting the top platform 16b to the bottom platform 16a of the movable carriage serves to adjust the verticality of the top platform 16b of the carriage.

With reference to FIGS. 7 to 14, there follows a description of the various characteristics of the rotary frame 14 of the spiral winding machine of the invention.

As mentioned above, the rotary frame 14 has winding means proper and it is suitable for turning around the axis of symmetry X-X of the unit pipe element.

For this purpose, the rotary frame comprises a support structure 44 of polygonal shape having a plurality of faces with the winding element 46 mounted thereon. Each of the faces of this polygonal structure has a respective winding element 46 mounted thereon.

In the example shown, the support structure 44 is in the form of a nonagon having nine faces serving to support nine winding elements 46.

In this embodiment, provision is also made to lay nine cables simultaneously and helically on the outside surface of the unit pipe element. Naturally, depending on the number of cables for laying, the support structure of the rotary frame could be of some other shape.

The winding elements 46 are designed to receive cables for laying helically on the unit pipe element. These winding elements are regularly spaced apart from one another around the axis of symmetry X-X of the unit pipe element, and each of them lies in a plane P that is substantially longitudinal relative to the unit pipe element.

More precisely, each winding element 46 comprises in particular a storage reel 48 having wound thereon the cable for laying together with its plastics strips, and also an unwinding reel 50 for receiving one end of the cable unwound from the storage reel and for taking it to the outside surface of the unit pipe element, the storage and unwinding reels of each winding element being in alignment in the plane P.

Figure 10:
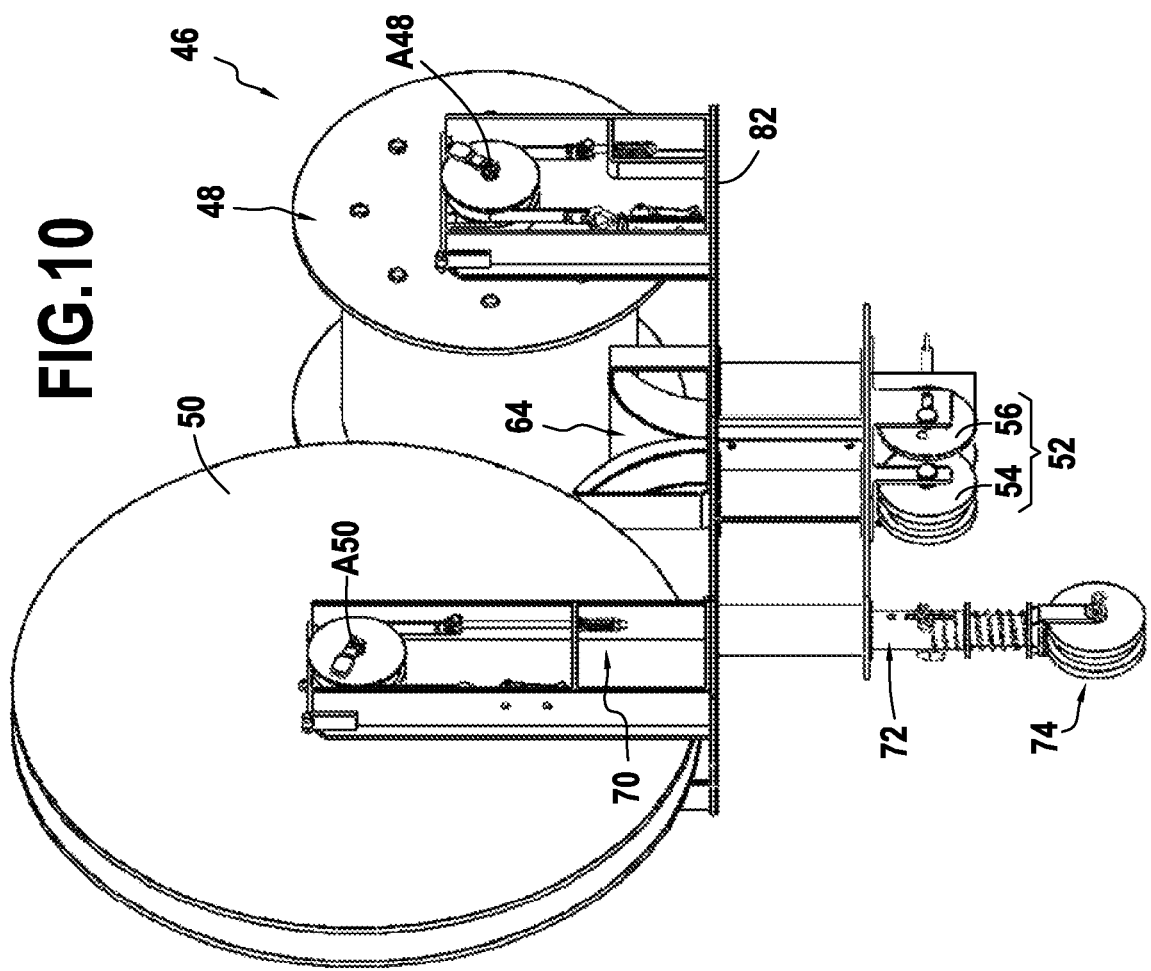
FIG. 10 is a perspective view of a winding element of the FIG. 1 spiral winding machine.

As shown in FIG. 10, each winding element 46 also has a guide system for guiding the cable that is unwound from the storage reel 48 to the outside surface of the unit pipe element.

The guide system of each winding element comprises more particularly a roller device 52 for automatically removing the plastics strips covering the two adhesive strips of the cable prior to laying the cable on the outside surface of the unit pipe element.

The roller device 52 can be seen in detail in FIG. 12. It comprises a drive roller 54 that is for receiving a free end of the cable coming from the unwinding reel 50 and two winding rollers 56 mounted on a support 58 and onto which they are to wind the two plastics strips that have been separated from the cable.

These rollers 54 and 56 present respective axes of rotation A54 and A56 that are parallel (the winding rollers 56 being on a common axis). The rollers are also positioned in contact with one another so that the drive roller 54 drives the two winding rollers 56 in rotation. In addition, the winding rollers 56 are movable in translation along an axial slot 57.

Figure 13:
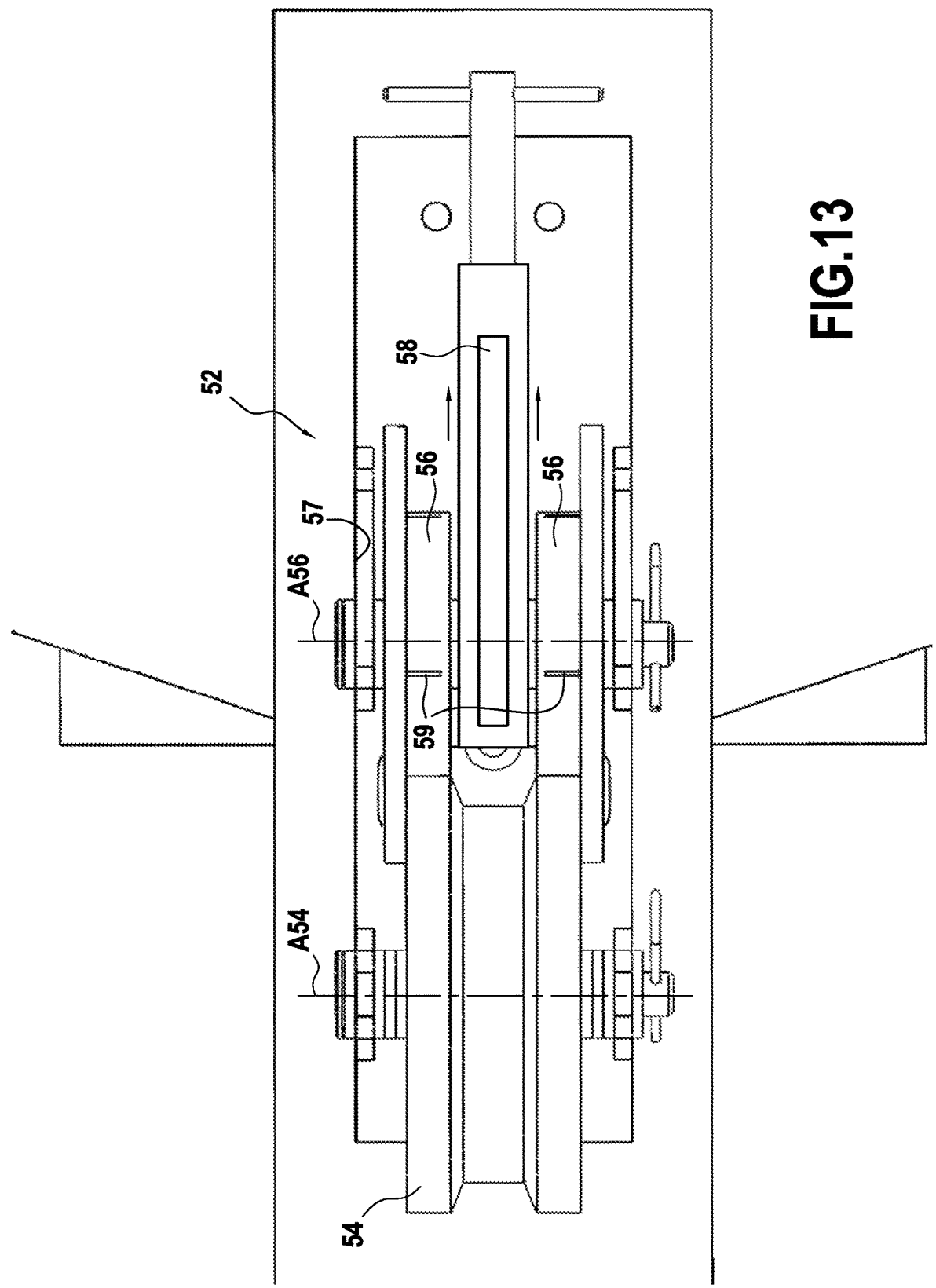
FIG. 13 is a view from beneath of the FIG. 12 roller device.

As shown in FIG. 13, the winding rollers 56 of this device present respective notches 59 for receiving one end of a plastics strip (not shown in the figure) that is to be separated from the cable.

The cable still carrying its two plastics strips passes between the drive roller 54 and the two winding rollers 56 as represented by arrow F in FIG. 12. A spring 62 having one end fastened to the support 58 for the winding rollers 56 serves to keep the winding rollers permanently in contact with the drive roller 54. With the ends of the plastics strips anchored in the respective notches 59 of the winding rollers, these strips become wound around the winding rollers progressively as the cable passes between the two rollers 54, 56.

Furthermore, as the two plastics strips are wound progressively around the winding rollers 56, the diameters of the winding rollers increases, such that the axis A56 of the winding rollers shift in axial translation along the slot 57. The presence of the spring 62 serves to keep the driving roller and the winding rollers permanently in contact in spite of this movement in axial translation of the axis of the winding rollers.

The system for guiding each winding element also comprises a deflector 64 for guiding the cable from the unwinding reel 50 towards the above-described roller device 52 and then towards the outside surface of each unit pipe element. As shown in FIG. 10, the presence of such a deflector 64 in the form of a funnel terminating in a ramp serves in particular to avoid the cable becoming jammed as it travels from the unwinding reel towards the unit pipe element.

Figure 11:
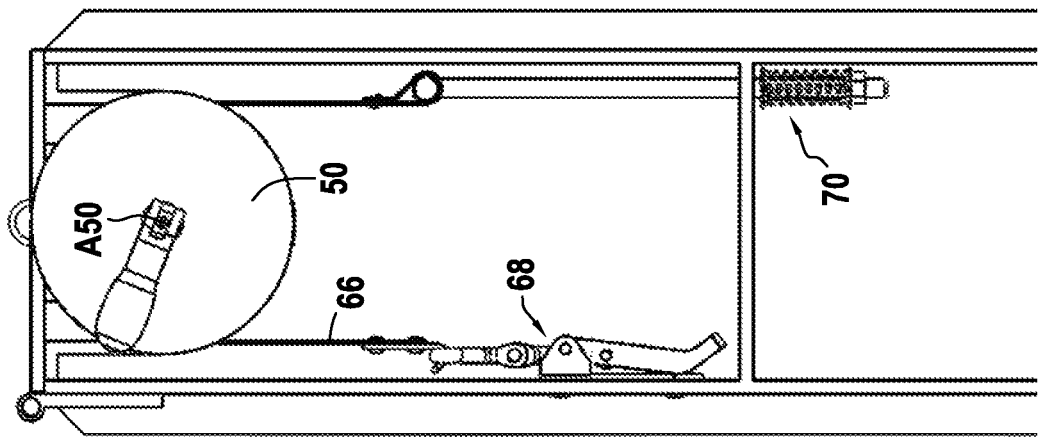
FIG. 11 is a side view of an unwinding reel of the FIG. 10 winding element.

In an advantageous provision of the invention, as shown in FIG. 11, the storage reel 48 and the unwinding reel 50 in each winding element are provided with respective braking systems.

The reels 48, 50, which are mounted on smooth bearings (not shown in the figures), are provided with respective adjustable brake strips 66 that are fastened at one end by means of a hook system 68 and that are connected at the other end to a spring system 70. The spring system serves to generate a rotation-impeding force (of the order of a few newtons) on the reels, thereby serving firstly to provide a tensioning force on the cable while it is being laid, and secondly to slow down the reels progressively when the cable laying process is stopped.

Figure 14:
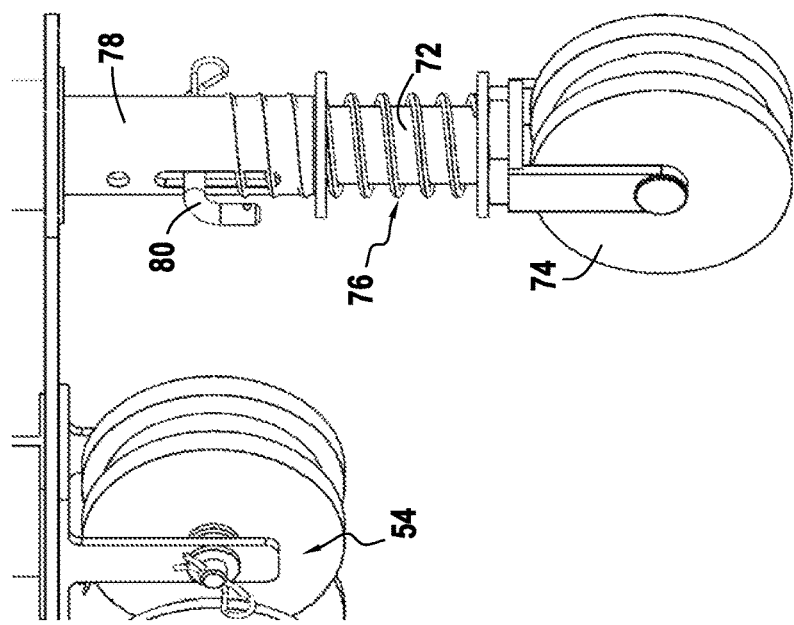
FIG. 14 is a perspective view of a system for compressing the FIG. 10 winding element.

As shown in particular in FIGS. 10 and 14, each winding element also has a compression system for applying a compression force on the cable that has just been placed on the outside surface of the unit pipe element.

The compression system comprises a telescopic rod 72 having one end fastened to the unwinding reel 50 and an opposite end connected to a reel 74, with there being a spring 76 interposed between them. More precisely, the reel 74 is fastened to the end of the rod 72, the rod being suitable for sliding inside a sheath 78, with the spring 76 being interposed between the rod and the sheath.

As a result, the spring 76 serves to apply pressure on the reel so as to keep it in contact with the outside surface of the unit guide element while the cable is being laid. Thus, the reel 74 runs on the outside surface of the unit pipe element and constantly exerts a compression force on the cable while it is being laid, with this continuing regardless of any departure from concentricity of the unit pipe element.

Furthermore, the reel 74 can occupy two positions: a "working" position in which the spring exerts pressure on the reel while the cable is being laid, and a rest position (not shown in the figures) in which the rod 72 carrying the reel is retracted into the inside of the sheath 78 and is held in this position by means of a pin 80.

Figure 15:
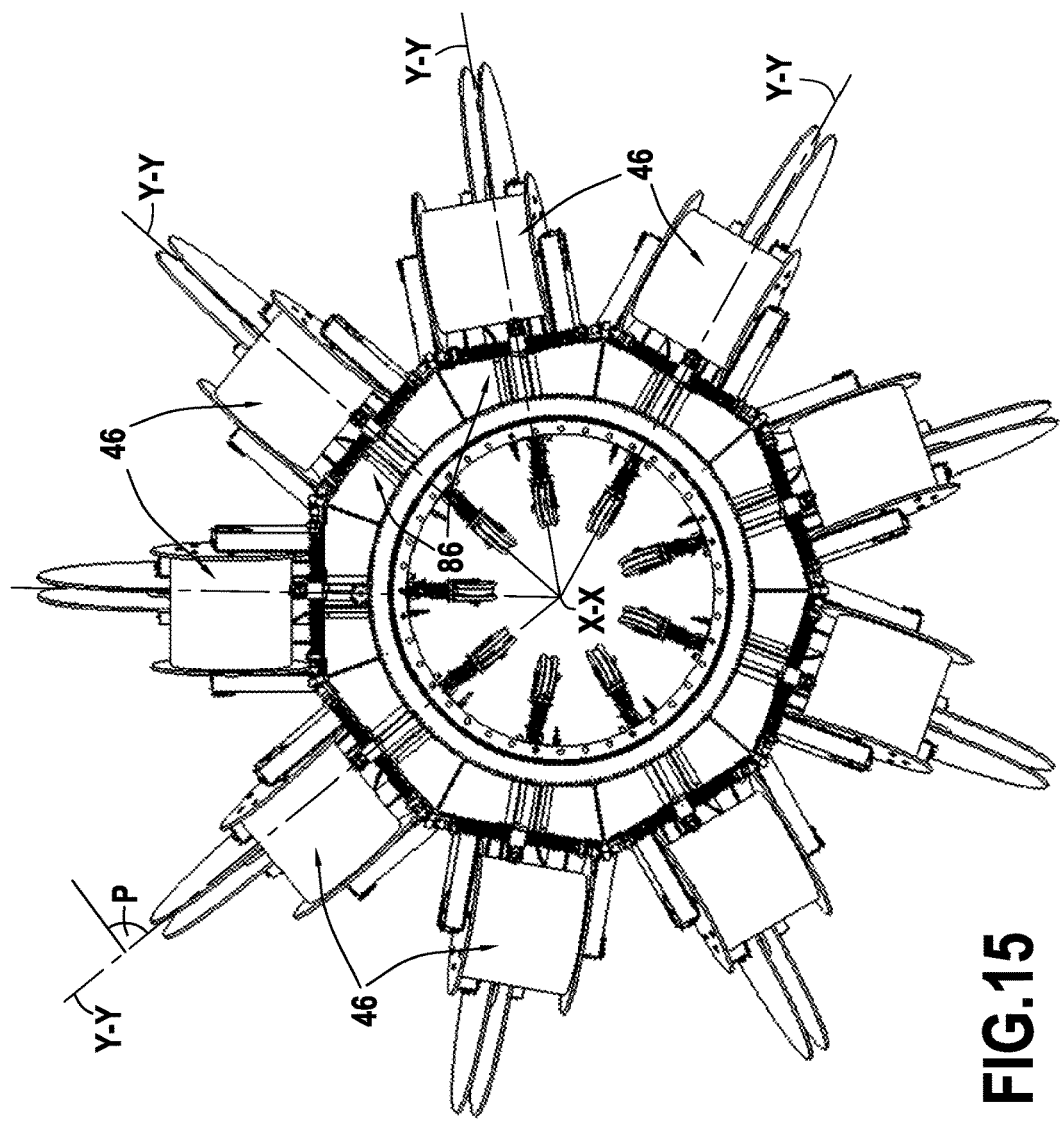
FIG. 15 is a front view of the rotary frame of the FIG. 1 spiral winding machine.
Figure 16:
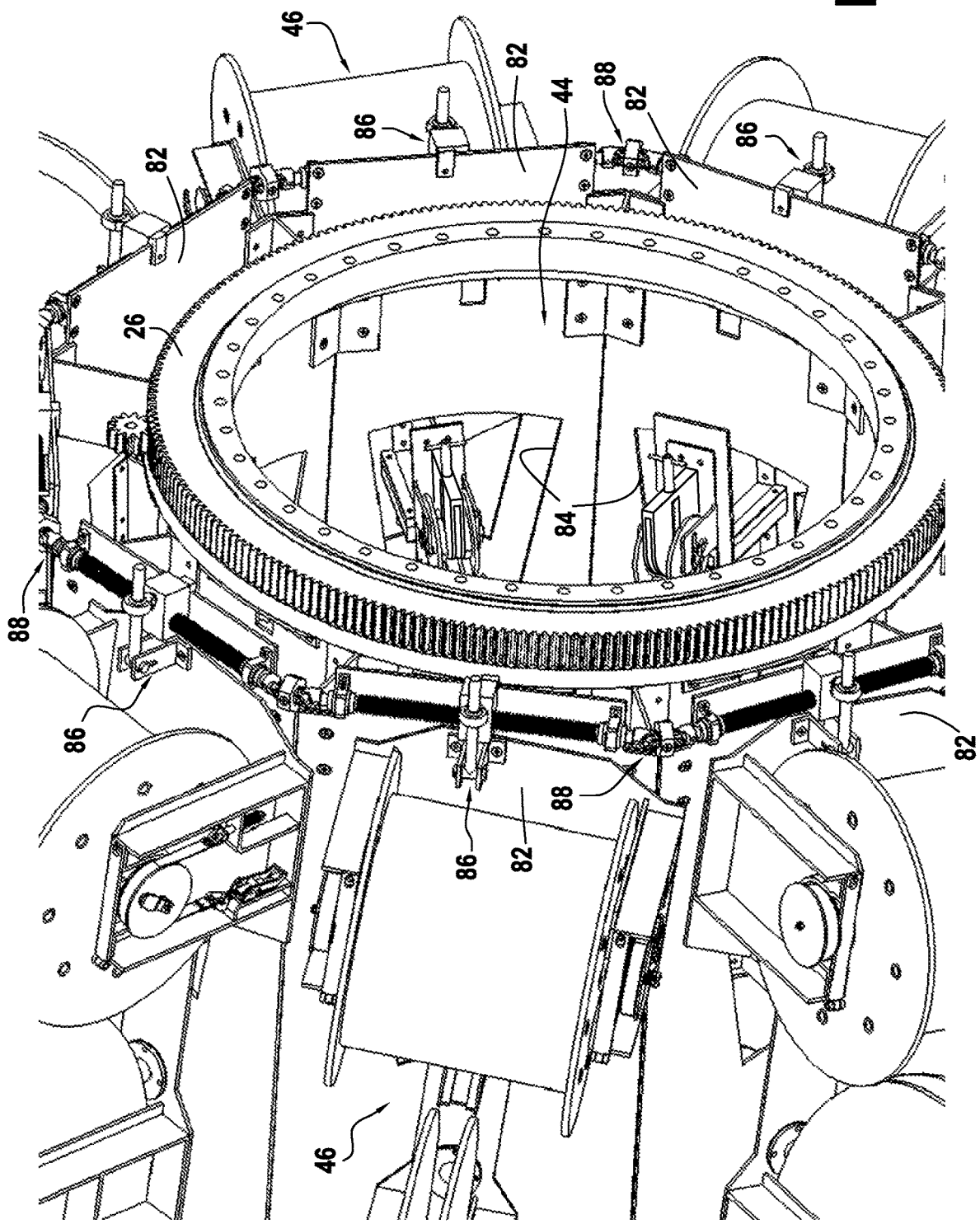
FIG. 16 is a fragmentary view in perspective of the FIG. 15 rotary frame showing in greater detail the mechanism for adjusting the angle of inclination of each winding element.
Figure 17:
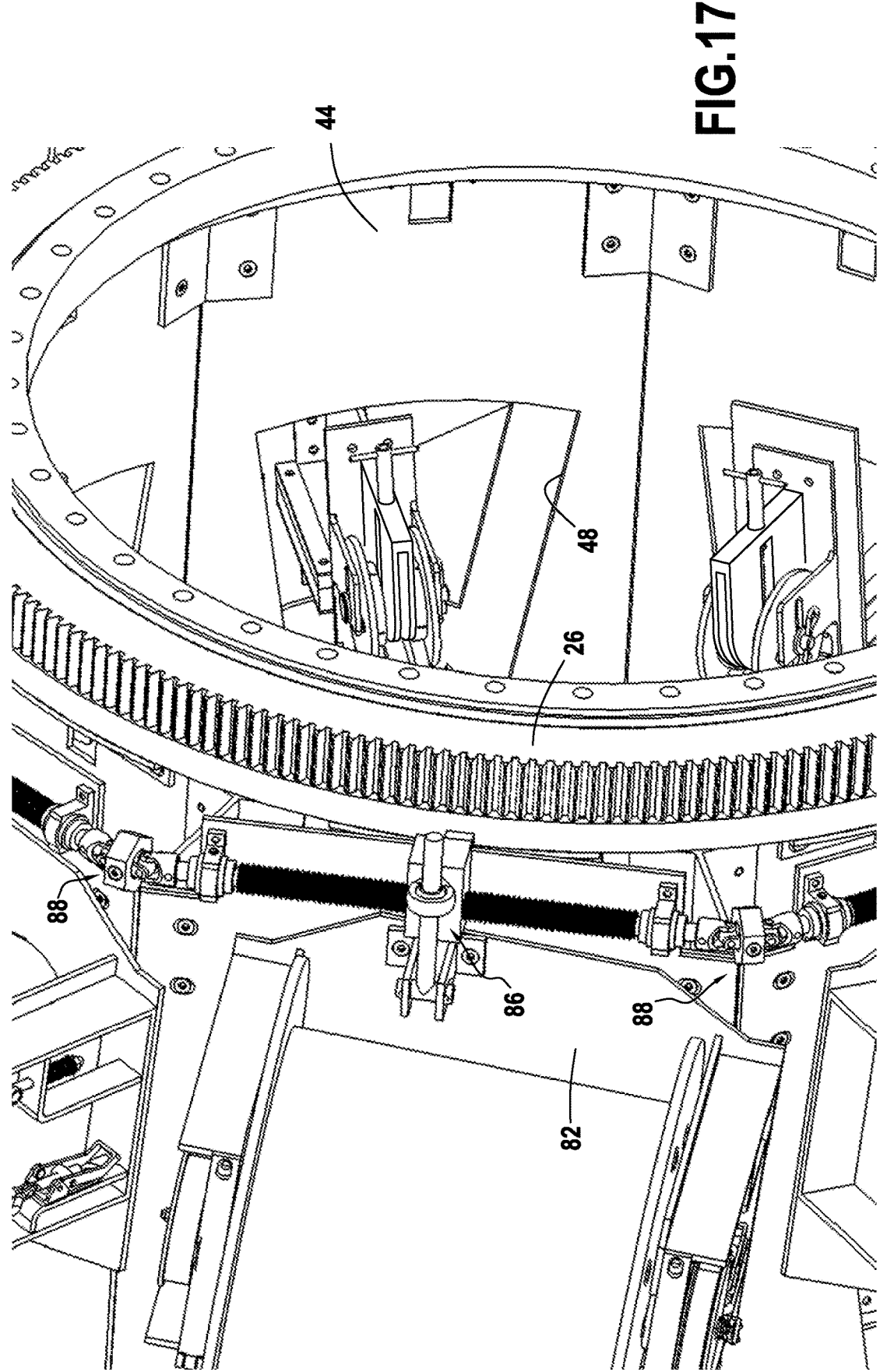
FIG. 17 is an enlargement of FIG. 16.

In another advantageous provision of the invention, each winding element 46 is mounted on a respective face of the support structure 44 via a plate 82 (see FIGS. 10, 16, and 17) that is suitable for turning about a radial axis Y-Y that is radial relative to the of symmetry X-X of the unit pipe element (see FIG. 15).

In particular, each winding element 46 is secured to a plate 82 that is fastened on the support structure 44, the storage and unwinding reels 48 and 50 of each winding element being positioned on the outside of the support structure, while the roller device 52 and the compression system project from the inside by passing through windows 84 formed in the support structure (see FIG. 9).

Furthermore, each plate 82 is coupled to adjust its turning about the radial axes Y-Y to a wormscrew system 86. By adjusting the turning of the plate 82 relative to the radial axes Y-Y, the angle of inclination of each winding element 46 is adjusted relative to the longitudinal plane P in which it is situated. This adjustment serves in particular to limit the twisting effect acting on the cables as a result of the frame of the spiral winding machine rotating while they are being laid on the outside surface of the unit pipe element. Preferably, these wormscrew systems 86 are synchronized with one another so as to give the same angle of inclination to each winding element. For this purpose, the wormscrew systems of the spiral winding machine are fastened to one another by cardan joints 88 (see FIG. 16 in particular).

An example application of the spiral winding machine of the invention for laying cables simultaneously and helically on the outside surface of a unit pipe element is described below.

In this application example, the unit pipe element presents a length of 50 m and it is desired to lay nine cables helically on its outside surface, e.g. at a helical pitch of 6 m. The helical pitch is obtained by adjusting the angle of inclination of each winding element 46 relative to the longitudinal plane P in which it is situated.

As shown in FIG. 1, the unit pipe element 2 is positioned horizontally on the supports 6. For a unit pipe element having a length of 50 m, six supports 6 may be used by way of example which supports are spaced apart from one another by 10 m, including with one support at each end of the unit pipe element.

The spiral winding machine 2 is positioned at one of the ends of the unit pipe element with its rotary frame 14 arranged around the unit pipe element. The lasers 36 of the spiral winding machine are pointed at the reflecting panel that is positioned at the other end of the unit pipe element.

The linear travel stepper motor 20 and the rotary travel stepper motor 28 of the spiral winding machine are remotely controlled from a workstation (not shown in the figures). By measuring the linear advance of the spiral winding machine, as performed by means of the optical means (lasers 36 and reflecting panel), the workstation serves in particular to synchronize these two motors 20 and 28 so as to ensure that the nine cables are laid with the desired helical pitch and as a function of the linear travel speed of the carriage of the spiral winding machine. Knowing the advance of the spiral winding machine, the workstation adapts the speed of rotation of the rotary frame. In particular, when rotation is delayed, the workstation imposes a higher speed of rotation in order to catch up the delay (and vice versa).

The motors 20 and 28 may be programmed in various ways. The stepper motors may be programmed to operate in "speed mode" in which the program setpoint is a setpoint for the speed of advance of the machine (e.g. 5 meters per minute (m/min)). The stepper motors could equally well be programmed to operate in "drive torque mode" in which the program setpoint is a drive torque setpoint. The stepper motors could equally well be programmed to operate in "position mode", in which the program setpoint is a number of motor steps (e.g. 5000 steps).

Once the stepper motors 20 and 28 have been programmed by the workstation, the spiral winding machine advances linearly towards the opposite end of the unit pipe element with its rotary frame rotating synchronously so as to lay all nine cables simultaneously and helically on the outside surface of the unit laying element. The advance of the spiral winding machine is stopped automatically by the optical means.

FIG. 18 shows the result of the spiral winding, with the outside surface of the unit pipe element 2 representing nine cables 90 that have been laid helically.

The invention claimed is:

1. A machine for laying cables helically on the outside surface of a unit pipe element for transporting fluids, the machine comprising:
    a rotary frame for centering about an axis of symmetry (X-X) of the unit pipe element, the frame supporting a plurality of winding elements designed to receive cables for laying on the unit pipe element, each winding element being situated in a respective plane (P) that is substantially longitudinal relative to the unit pipe element and the planes being spaced apart from one another around the axis of symmetry of the unit pipe element;
    means for adjusting the angle of inclination of each winding element relative to the longitudinal plane in which it is situated;
    a linear travel stepper motor for moving the frame along the unit pipe element; and
    a rotary travel stepper motor for causing the frame to turn about that axis of symmetry of the unit pipe element;
    each winding element comprising:
    a storage reel having the cable for laying on the unit pipe element wound thereon:
    an unwinding reel for receiving one end of the cable unwound from the storage reel in order to take it to the outside surface of the unit pipe element;
    a guide system for guiding the cable unwound from the storage reel to the outside surface of the unit pipe element; and
    a compression system for applying a compression force on the cable that has just been laid on the outside surface of the unit pipe element.

2. The machine according to claim 1, wherein the compression system of each winding element comprises a telescopic rod having one end fastened to the unwinding reel and an opposite end connected to a wheel with a spring being interposed between them, said wheel being suitable for running on the outside surface of the unit guide element while the cable is being laid.

3. The machine according to claim 1, wherein the guide system for each winding element comprises:
    a roller device for automatically removing plastics strips covering adhesive strips of the cable prior to laying said cable on the outside surface of the unit pipe element; and
    a deflector for guiding the cable from the unwinding reel to the roller device.

4. The machine according to claim 3, wherein the roller device comprises a drive roller for receiving a free end of the cable coming from the unwinding reel together with winding rollers for having wound thereon the plastics strips separated from the cable.

5. The machine according to claim 1, wherein each storage reel and unwinding reel is provided with a braking system.

6. The machine according to claim 1, wherein each winding element is mounted on a face of the frame via a plate that is suitable for turning about a radial axis (Y-Y) that is radial relative to the axis of symmetry (X-X) of the unit pipe element, the frame also comprising a wormscrew system coupled to each plate in order to adjust the angle of inclination of each winding element relative to the longitudinal plane in which it is situated.

7. The machine according to claim 6, wherein the wormscrew systems synchronized with one another in order to enable the same angle of inclination to be given to each winding element.

8. The machine according to claim 1, further comprising a carriage supporting the frame via a guide ring for centering on the axis of symmetry of the unit pipe element, the carriage being provided with wheels driven by the linear travel stepper motor and suitable for traveling along a guide rail.

9. The machine according to claim 8, wherein the guide ring of the carriage includes a toothed wheel that meshes rotatably with the rotary travel stepper motor.

10. The machine according to claim 8, wherein the carriage comprises:
    means for adjusting the vertical position and the horizontal position of the frame; and
    guide rollers for guiding the unit pipe element.

11. The machine according to claim 1, further comprising optical means for determining the distance between the frame and the end of the unit pipe element towards which the frame is traveling.

12. The machine according to claim 1, wherein the frame is polygonal in shape having a plurality of faces on which the winding elements are mounted.

13. A method of laying cables helically on the outside surface of a fluid transport unit pipe element by means of a machine according to claim 1, the method comprising:
    positioning the rotary frame of the machine around an axis of symmetry (X-X) of the unit pipe element at one of its ends; and
    controlling the linear travel and rotary travel stepper motors of the machine so as to enable the machine to advance linearly towards the opposite end of the unit pipe element with rotation of its rotary frame being synchronized in order to ensure that all of the cables are laid simultaneously and helically on the outside surface of the unit laying element.

* * * * *